US010289621B2

(12) United States Patent
Lin et al.

(10) Patent No.: US 10,289,621 B2
(45) Date of Patent: May 14, 2019

(54) METHOD AND APPARATUS FOR RECOMMENDING MULTIMEDIA RESOURCE (71) Applicant: Xiaomi Inc., Beijing (CN)

(72) Inventors: Bin Lin, Beijing (CN); Bo Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 641 days.

(21) Appl. No.: 14/585,960

(22) Filed: Dec. 30, 2014

(65) Prior Publication Data

US 2015/0347416 A1    Dec. 3, 2015

Related U.S. Application Data (63) Continuation of application No. PCT/CN2014/089247, filed on Oct. 23, 2014.

(30) Foreign Application Priority Data

May 28, 2014 (CN) .......................... 2014 1 0230541

(51) Int. Cl.
H04N 21/25 (2011.01)
G06F 16/2457 (2019.01)
(Continued)

(52) U.S. Cl.
CPC ........ G06F 16/24578 (2019.01); G06F 16/22 (2019.01); G06F 16/2457 (2019.01);
(Continued)

(58) Field of Classification Search
CPC ........... G06F 17/3053; G06F 17/30312; G06F 17/30522; H04N 21/2187; H04N 21/251;
(Continued)

(56) References Cited

U.S. PATENT DOCUMENTS 8,751,957 B1   6/2014 Trajkovic et al.
2003/0014407 A1   1/2003 Blatter et al.
(Continued)

FOREIGN PATENT DOCUMENTS

CN    1418341 A    5/2003
CN    1788280 A    6/2006
(Continued)

OTHER PUBLICATIONS

Extended Search Report for European Application No. 15169070.8 from the European Patent Office, dated Nov. 3, 2015.
(Continued)

*Primary Examiner* — Pankaj Kumar
*Assistant Examiner* — Alexander Boyd
(74) *Attorney, Agent, or Firm* — Finnegan, Henderson, Farabow, Garrett & Dunner LLP (57) ABSTRACT A method for recommending a multimedia resource is provided. The method includes acquiring user viewing data of a to-be-recommended multimedia resource in a playing trial run. The user viewing data includes at least user audio and video data and user video depth data. The method further includes analyzing the user viewing data to obtain user action data corresponding to the to-be-recommended multimedia resource, calculating a first user preference score of the to-be-recommended multimedia resource based on the user action data, acquiring a plurality of second user preference scores of a plurality of recommended multimedia resources, and recommending the to-be-recommended multimedia resource based on the first user preference score and the second user preference scores.

9 Claims, 6 Drawing Sheets (51) Int. Cl.
*G06F 16/22* (2019.01)
*H04N 21/442* (2011.01)
*H04N 21/2187* (2011.01)
*H04N 21/2743* (2011.01)
*H04N 21/414* (2011.01)
*H04N 21/422* (2011.01)
*H04N 21/472* (2011.01)
*H04N 21/482* (2011.01)
*H04N 21/81* (2011.01)
*H04N 21/845* (2011.01)
*H04N 21/8547* (2011.01)

(52) U.S. Cl.
CPC ....... *H04N 21/2187* (2013.01); *H04N 21/251* (2013.01); *H04N 21/2743* (2013.01); *H04N 21/41407* (2013.01); *H04N 21/422* (2013.01); *H04N 21/44218* (2013.01); *H04N 21/44222* (2013.01); *H04N 21/47214* (2013.01); *H04N 21/4826* (2013.01); *H04N 21/8133* (2013.01); *H04N 21/8455* (2013.01); *H04N 21/8547* (2013.01)

(58) Field of Classification Search
CPC ......... H04N 21/2743; H04N 21/41407; H04N 21/422; H04N 21/44218; H04N 21/44222; H04N 21/47214; H04N 21/4826; H04N 21/8133; H04N 21/8455; H04N 21/8547
See application file for complete search history.

(56) References Cited

U.S. PATENT DOCUMENTS

| | | | |
|---|---|---|---|
| 2009/0013002 | A1 | 1/2009 | Eggink et al. |
| 2009/0144225 | A1 | 6/2009 | Saito et al. |
| 2010/0211439 | A1* | 8/2010 | Marci ................ H04N 21/252 725/12 |
| 2011/0029666 | A1 | 2/2011 | Lopatecki et al. |
| 2012/0222057 | A1* | 8/2012 | Sadowsky ............ H04N 21/251 725/10 |
| 2013/0110618 | A1* | 5/2013 | Wu ................ G06Q 30/0201 705/14.46 |
| 2013/0298146 | A1* | 11/2013 | Conrad ................ H04N 21/252 725/12 |
| 2015/0067708 | A1* | 3/2015 | Jensen ............... H04N 21/4756 725/10 |
| 2015/0312603 | A1* | 10/2015 | Singh ................... H04N 21/251 725/93 |

FOREIGN PATENT DOCUMENTS

| | | |
|---|---|---|
| CN | 101763351 A | 6/2010 |
| CN | 101901450 A | 12/2010 |
| CN | 102402625 A | 4/2012 |
| CN | 102780920 A | 11/2012 |
| CN | 103136351 A | 6/2013 |
| CN | 103324729 A | 9/2013 |
| CN | 103327111 A | 9/2013 |
| CN | 103500215 A | 1/2014 |
| CN | 103514255 A | 1/2014 |
| CN | 103544212 A | 1/2014 |
| CN | 104035982 A | 9/2014 |
| EP | 1511315 A2 | 3/2005 |
| EP | 2 950 551 B1 | 5/2015 |
| JP | 2006325011 A | 11/2006 |
| JP | 2009081637 A | 4/2009 |
| JP | 2009267445 A | 11/2009 |
| JP | 2011166572 A | 8/2011 |
| JP | 2013109537 A | 6/2013 |
| KR | 1020090121016 | 11/2009 |
| KR | 1020140004740 | 1/2014 |
| RU | 2406132 C2 | 12/2010 |
| RU | 2427975 C2 | 8/2011 |
| RU | 2506635 C2 | 2/2014 |
| WO | WO 2011/006971 A1 | 1/2011 |

OTHER PUBLICATIONS

English version of International Search Report of PCT International Application No. PCT/CN2014/089247, from the State Intellectual Property Office of China, dated Mar. 4, 2015 (2 pages).

International Search Report of PCT International Application No. PCT/CN2014/089247, from the State Intellectual Property Office of China, dated Mar. 4, 2015 (4 pages).

* cited by examiner

METHOD AND APPARATUS FOR RECOMMENDING MULTIMEDIA RESOURCE

This application is a Continuation application of International Application PCT/CN2014/089247, filed Oct. 23, 2014, which is based upon and claims priority to Chinese Patent Application No. 201410230541.3, filed May 28, 2014, the entire contents of all of which are incorporated herein by reference.

TECHNICAL FIELD

The present disclosure generally relates to the field of multimedia resource technology and, more particularly, to a method and an apparatus for recommending a multimedia resource.

BACKGROUND

In the information age, when a user visits internet or watches a video program, it may be advantageous if multimedia resources that interest the user can be recommended to the user. Not only will it facilitate user operations such as browsing or allowing the user to pay attention to relevant products which, in turn, enhances the user's experience, but also a provider of the multimedia resources may be allowed to evaluate the extent of user attention to the multimedia resources.

Conventionally, a multimedia resource is usually recommended in the following manner. First, the multimedia resource to be recommended is scored based on a preference degree. The multimedia resource is recommended to a user according to the score of the multimedia resource. Scoring based on the preference degree may be performed in the following manner. First, a multimedia resource similar to the multimedia resource to be recommended is determined according to a type of the multimedia resource to be recommended. A user preference score of the multimedia resource to be recommended is determined according to a user preference score of the similar multimedia resource. The user preference score of the similar multimedia resource is obtained in the following manner. The similar multimedia resource is released to a plurality of playing devices, which present the similar multimedia resource to a plurality of users. Sensors for collecting user reactions are mounted on or in vicinity of the plurality of the playing devices. The number of users and the time the users spend on the similar multimedia resource are collected by the sensors. The user preference score of the similar multimedia resource is then calculated based on the number of users and the time the users spent on the similar multimedia resource.

In the above conventional recommendation method, the user preference score is based on simple statistics of user data (the number of users and the time the users spend on a multimedia resource). As a result, the conventional recommendation method may not achieve an accurate result.

SUMMARY

According to a first aspect of the present disclosure, there is provided a method for recommending a multimedia resource, comprising: acquiring user viewing data of a to-be-recommended multimedia resource in a playing trial run, wherein the user viewing data includes at least user audio and video data and user video depth data; analyzing the user viewing data to obtain user action data corresponding to the to-be-recommended multimedia resource; calculating a first user preference score of the to-be-recommended multimedia resource based on the user action data; acquiring a plurality of second user preference scores of a plurality of recommended multimedia resources; and recommending the to-be-recommended multimedia resource based on the first user preference score and the second user preference scores.

According to a further aspect of the present disclosure, there is provided a server for recommending a multimedia resource, comprising: a processor; and a memory for storing instructions executable by the processor; wherein the processor is configured to: acquire user viewing data of a to-be-recommended multimedia resource in a playing trial run, wherein the user viewing data includes at least user audio and video data and user video depth data; analyze the user viewing data to obtain user action data corresponding to the to-be-recommended multimedia resource; calculate a first user preference score of the to-be-recommended multimedia resource based on the user action data; acquire a plurality of second user preference scores of a plurality of recommended multimedia resources; and recommend the to-be-recommended multimedia resource based on the first user preference score and the second user preference scores.

According to another aspect of the present disclosure, there is provided a non-transitory storage medium having stored therein instructions that, when executed by one or more processors of a server for recommending a multimedia resource, cause the server to perform: acquiring user viewing data of a to-be-recommended multimedia resource in a trial playing run, wherein the user viewing data includes at least user audio and video data and user video depth data; analyzing the user viewing data to obtain user action data corresponding to the to-be-recommended multimedia resource; calculating a first user preference score of the to-be-recommended multimedia resource based on the user action data; acquiring a plurality of second user preference scores of a plurality of recommended multimedia resources; and recommending the to-be-recommended multimedia resource based on the first user preference score and the second user preference scores.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
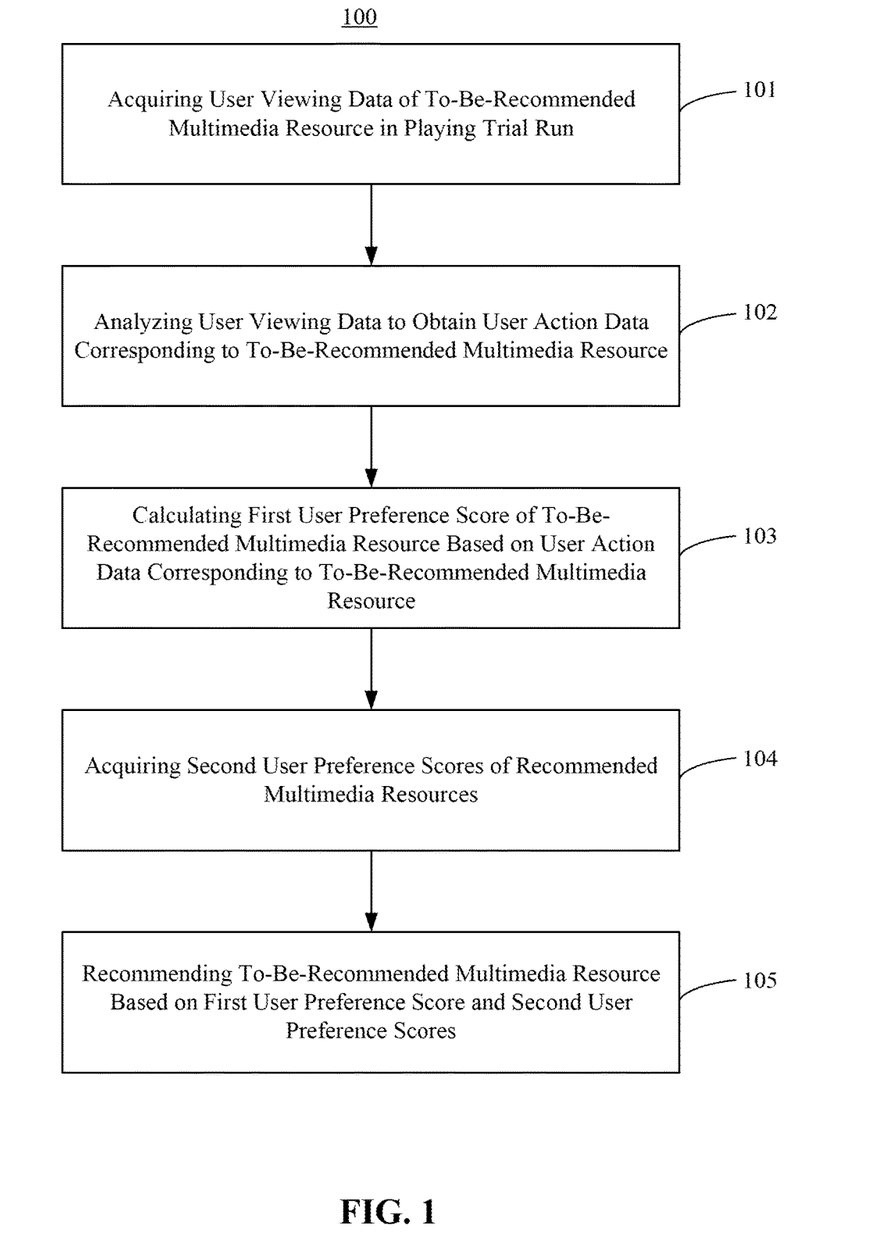
FIG. 1 is a flow chart of a method for recommending a multimedia resource, according to an exemplary embodiment.

FIG. 1 is a flow chart of a method 100 for recommending a multimedia resource, according to an exemplary embodiment. For example, the method 100 may be performed in a server. Referring to FIG. 1, the method 100 includes the following steps.

In step 101, the server acquires user viewing data of a multimedia resource to be recommended (to-be-recommended multimedia resource) in a playing trial run. For example, the user viewing data includes at least user audio and video data and user video depth data. The user video depth data may be obtained by using a recognition algorithm to determine an action of the user from images in the video data. For example, video depth data may indicate that the user closes his/her eyes, which may be used to determine that the user is sleeping and not interested in the to-be-recommended multimedia resource. The user viewing data may be collected by a plurality of first sensors which are mounted on or in vicinity of a plurality of playing devices in the playing trial run.

In step 102, the server analyzes the user viewing data to obtain user action data corresponding to the to-be-recommended multimedia resource.

In step 103, the server calculates a first user preference score of the to-be-recommended multimedia resource based on the user action data corresponding to the to-be-recommended multimedia resource.

In step 104, the server acquires second user preference scores of a plurality of recommended multimedia resources.

In step 105, the server recommends the to-be-recommended multimedia resource based on the first user preference score and the second user preference scores.

In some embodiments, after the user viewing data of the to-be-recommended multimedia resource in the playing trial run is analyzed to obtain the user action data corresponding to the to-be-recommended multimedia resource, the first user preference score of the to-be-recommended multimedia resource is calculated based on the user action data. The to-be-recommended multimedia resource is then recommended based on the first user preference score and the second user preference scores of the plurality of recommended multimedia resources. Since the user preference score of the to-be-recommended multimedia resource are calculated based on the user action data corresponding to the to-be-recommended multimedia resource, and since the user action data may reflect real degree of preference of the users to the multimedia resource, the accuracy of recommending the to-be-recommended multimedia resource based on the user preference score of the to-be-recommended multimedia resource and the user preference scores of the recommended multimedia resources, is improved.

In exemplary embodiments, the server may calculate the first user preference score of the to-be-recommended multimedia resource based on the user action data corresponding to the to-be-recommended multimedia resource as follows. For each piece of the user action data, at least one user action included in the piece of user action data is determined. The server may inquire a pre-stored correlation between user actions and user preference values to obtain a user preference value corresponding to the at least one user action. The server may also determine a weight corresponding to each of the user actions according to a ratio of a duration of the user action to a playing time of the to-be-recommended multimedia resource. The server may calculate the first user preference score of the to-be-recommended multimedia resource based on the user preference value and the weight corresponding to the user action.

In exemplary embodiments, before the pre-stored correlation between the user actions and user preference values is inquired to obtain the user preference value corresponding to the at least one user action, the method may further include the following steps. A user preference value is preset for each of the user actions; and the correlation between the user actions and user preference values is stored.

In exemplary embodiments, recommending the to-be-recommended multimedia resource based on the first user preference score and the second user preference scores may include the following steps. Among the second user preference scores, one or more third user preference scores which are similar to the first user preference score are determined. The users to receive the to-be-recommended multimedia resource are determined based on the one or more third user preference scores. The to-be-recommended multimedia resource is sent to a playing device of the receiving users.

In exemplary embodiments, the second user preference scores may be calculated based on data collected by a plurality of second sensors, which are mounted on or in vicinity of a plurality of playing devices corresponding to the recommended multimedia resources.

In exemplary embodiments, determining the users to receive the to-be-recommended multimedia resource based on the one or more third user preference scores may include: determining that the one or more third user preference scores are greater than a preset threshold; and determining users corresponding to the one or more third user preference scores, respectively, which are greater than the preset threshold as the receiving user(s) of the to-be-recommended multimedia resource.

In exemplary embodiments, after the to-be-recommended multimedia resource is sent to the playing device(s) of the receiving user(s), the method may further include one or more of the following steps: acquiring user viewing data collected by one or more third sensors corresponding to the to-be-recommended multimedia resource, the one or more third sensors being disposed on or in vicinity of the playing devices of the receiving user(s); analyzing the user viewing data collected by the one or more third sensors, to obtain a plurality pieces of user action data corresponding to the to-be-recommended multimedia resource; based on each piece of the user action data, updating the first user preference score of the to-be-recommended multimedia resource; and determining the effectiveness of the to-be-recommended multimedia resource based on the updated first user preference score.

In exemplary embodiments, the user viewing data is collected by the plurality of first sensors which are mounted on or in vicinity of a plurality of playing devices in the playing trial run.

Figure 2:
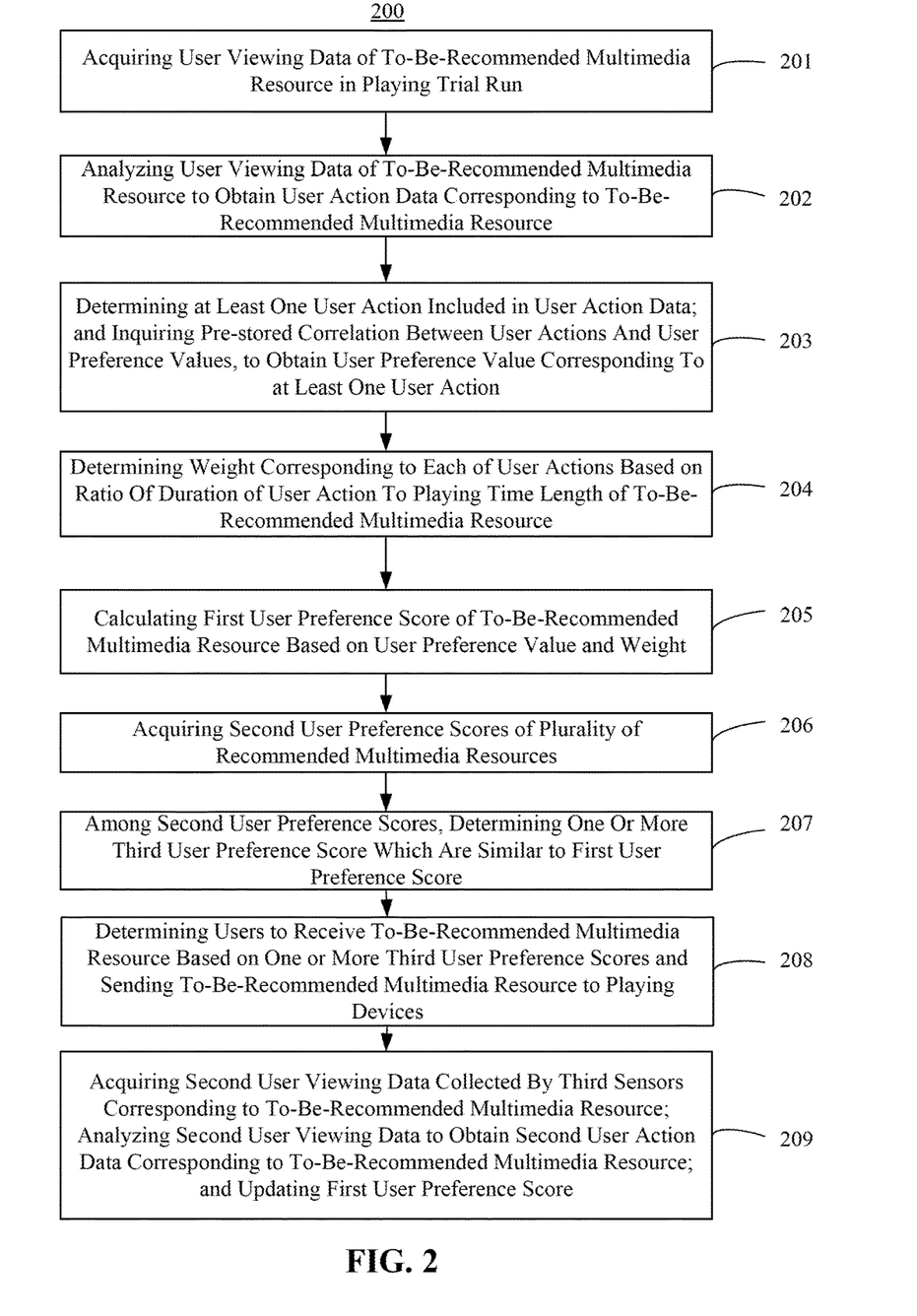
FIG. 2 is a flow chart of a method for recommending a multimedia resource, according to an exemplary embodiment.

FIG. 2 is a flow chart of a method 200 for recommending a multimedia resource, according to an exemplary embodiment. For example, the method 200 may be performed in a server. Referring to FIG. 2, the method 200 includes the following steps.

In step 201, the server acquires user viewing data of a to-be-recommended multimedia resource in a playing trial run. The user viewing data is collected by a plurality of first sensors which are mounted on or in vicinity of a plurality of playing devices in the playing trial run.

In exemplary embodiments, the playing trial run refers to releasing the to-be-recommended multimedia resource to a small number of playing devices associated with some users. For example, if a provider of the to-be-recommended multimedia resource intends to release the to-be-recommended multimedia resource nationwide, the playing trial run may be conducted in one province or one city. As another example, if the provider intends to release the to-be-recommended multimedia resource within a city, the playing trial run may be conducted in one district of the city.

In addition, the user viewing data may include at least user audio and video data and user video depth data acquired by the first sensors within their covering range. Further, the user viewing data may include a number of the users, an identity of each user, a specific characteristic of each user (gender or approximate age), a specific action of each user, and so on, and may be acquired within the covering range of the first sensors.

In exemplary embodiments, the to-be-recommended multimedia resource may correspond to one identifier (ID) which may uniquely identify the to-be-recommended multimedia resource. In some embodiments, in order to identify and distinguish numerous multimedia resources, each multimedia resource is provided with an ID. The ID may be composed of numerals or characters, or a combination thereof, the form of which is not limited in the present disclosure.

In addition to the ID, a multimedia resource may further include other attribute information such as a type to which the multimedia resource belongs, a playing form of the multimedia resource, a version of the multimedia resource, a playing time of the multimedia resource, a playing duration of the multimedia resource, a playing device of the multimedia resource, and so on. The attribute information may be the user audio and video data. Types of multimedia resources may include household appliances, food, clothing, sporting goods, shoes, and hats, etc. Playing forms of multimedia resources may be videos, pictures, audios, etc. The playing time of the multimedia resource refers to at which specific time in a specific range of time the multimedia resource is played. The playing duration of the multimedia resource may equal to a time length of the multimedia resource itself, or may be greater than the time length of the multimedia resource itself. Playing devices of a multimedia resource may include multimedia playing devices in public or private areas.

In exemplary embodiments, a first sensor is provided on or in vicinity of each of the plurality of playing devices in the playing trial run, which receive the to-be-recommended multimedia resource. The first sensor may be used to acquire video depth data. A playing device such as an intelligent TV or an intelligent computer is usually provided with a built-in sensor, or provided with a built-in camera integrated with a sensor. For such a device, the sensor is disposed in the playing device. A playing device such as an ordinary TV or a display in a multimedia resource display booth in a public area generally has no built-in sensor. Therefore, a sensor needs to be provided on or in vicinity of the playing device, to collect user viewing data. For example, a sensor may include one or more of a microphone, a camera, a visual sensor with depth information, a sensor which emits near infrared light, a distance sensor, an optical sensor, and so on. The type of the sensor is not limited in the present disclosure.

Still referring to FIG. 2, in step 202, the server analyzes the user viewing data of the to-be-recommended multimedia resource, to obtain user action data corresponding to the to-be-recommended multimedia resource.

In exemplary embodiments, the plurality of playing devices in the playing trial run, which receive the to-be-recommended multimedia resource, may play, e.g., dozens or hundreds of multimedia resources in a period of time. The first sensors provided on or in vicinity of the plurality of playing devices, in turn, will collect dozens or hundreds of pieces of user viewing data corresponding to the multimedia resources, respectively. These pieces of user viewing data are mixed altogether. Therefore, the user viewing data of the to-be-recommended multimedia resource needs to be extracted from the numerous pieces of user viewing data. Extracting the user viewing data of the to-be-recommended multimedia resource may be implemented in the following manner.

A playing time of the to-be-recommended multimedia resource is acquired, and the user viewing data within a time period including the playing time is extracted from the numerous pieces of user viewing data. The user viewing data so obtained may be taken as the user viewing data of the to-be-recommended multimedia resource.

It should be noted, however, that in addition to the above extracting method, other extracting methods may be adopted, which are not limited in the present disclosure. After the user viewing data of the to-be-recommended multimedia resource is acquired, a plurality of pieces of user action data corresponding to the to-be-recommended multimedia resource may be obtained by analyzing the user viewing data. Specific implementation of obtaining user action data based on the user viewing data may be realized through a specific algorithm of the related art. One user may have a corresponding piece of user action data, which includes at least one user action. The user actions may include entering or departing the covering range of a first sensor, watching the to-be-recommended multimedia resource on a playing device, talking, laughing, a noticeable gesture, a noticeable body action, sleeping, sitting, walking, and so on. The types of the user actions are not limited in the present disclosure.

In step 203, the server determines at least one user action included in each of user action data and inquires a pre-stored correlation between the user actions and user preference values to obtain a user preference value corresponding to the at least one user action.

In exemplary embodiments, the user action data of one user may include one or more user actions. For example, a user may be laughing with a noticeable gesture (e.g., applauding) while watching the to-be-recommended multimedia resource. A user preference value represents a preference degree of a user to the to-be-recommended multimedia resource. In some embodiments, before the user preference value corresponding to the at least one user action is obtained, the correlation between the user actions and the user preference values may be established.

For example, a user preference value may be pre-determined for each of the user actions. The correlation between the user actions and user preference values can be stored in a memory device.

Two exemplary methods for pre-determining user preference values for the user actions are illustrated below.

First, different user preference values may be specified for different user actions according to empirical values. While watching a multimedia resource, if a user laughs or produces a noticeable body action, it may indicate that the user apparently likes the multimedia resource. On the other hand, if the user is sleeping or leaves the room immediately, it may indicate that the user apparently dislikes the multimedia resource. In this exemplary method, different user preference values may then be specified for different user actions based on such empirical values.

Second, a large quantity of user action data may be collected, analyzed and statistically processed with a machine learning algorithm. Different user preference values may then be specified for different user actions according to the results of the analyzing and statistical processing. Since this method of employing a machine learning algorithm to analyze a large quantity of user action data, the setting of user preference values for different user actions has a relatively high accuracy.

In step 204, the server determines a weight for each of the user actions according to a ratio of a duration of the user action to a playing time length of the to-be-recommended multimedia resource.

For example, a user may be attracted by a beginning of the to-be-recommended multimedia resource, laughing and gradually moving close to the playing device of the to-be-recommended multimedia resource. Afterwards, the user may lose interest in the subject presented by the to-be-recommended multimedia resource, and may directly leave the room. Under the circumstances, in order to more accurately determine the degree of user preference for the to-be-recommended multimedia resource.

A weight for a user action may be set based on the ratio of the duration of the user action to the time length of playing the to-be-recommended multimedia resource. For example, the corresponding weight increases as the ratio for the user action increases. As another example, assuming that the time length of playing the to-be-recommended multimedia resource is 30 seconds, during which time period a user may firstly produce a noticeable gesture, such as applauding drastically, and then talk with others and not watch the to-be-recommended multimedia resource anymore. If the duration of the noticeable gesture lasts for 5 seconds, then the ratio of the duration of the gesture to the time length of playing the to-be-recommended multimedia resource is 1/6. Moreover, the duration of talking to others and not watching the to-be-recommended multimedia resource is 25 seconds, so that the ratio of the duration of talking to the time length of playing the to-be-recommended multimedia resource is 5/6. Therefore, the weight for the talking may be far greater than the weight for the gesture.

In step 205, the server calculates the first user preference score of the to-be-recommended multimedia resource based on the user preference value and the weight corresponding to each of the user actions.

In exemplary embodiments, after a user preference value and a weight corresponding to each of the user actions are obtained according to the steps 203 and 204, the first user preference score of the multimedia resource based on data collected from a plurality of users may be obtained according to the following formula (1):

$$S = \frac{a_1 * r_1 + a_2 * r_2 + \ldots + a_n * r_n}{n}. \quad (1)$$

Wherein S refers to a first user preference score; each of $a_1$ to $a_n$ refers to a user preference value corresponding to each of the user actions; each of $r_1$ to $r_n$ refers to a weight corresponding to each of the user actions, and n refers to the number of the user actions.

Through steps 201 to 205, the first user preference score of the to-be-recommended multimedia resource may be obtained. In a subsequent process, the to-be-recommended multimedia resource may be recommended based on the first user preference score, to improve the accuracy of recommendation of a multimedia resource.

In step 206, the server acquires a plurality of second user preference scores of a plurality of recommended multimedia resources.

In exemplary embodiments, after the plurality of recommended multimedia resources are released, the server may keep modifying the user preference scores of the plurality of recommended multimedia resources to obtain the second user preference scores based on user viewing data of the plurality of recommended multimedia resources collected by the sensors through steps similar to the above steps 201 to 205. The server may store the second user preference scores in its storage medium. Because each multimedia resource has an identifier, the second user preference scores of the plurality of recommended multimedia resources may be acquired from the storage medium according to the identifiers of respective recommended multimedia resources. The storage medium may be a memory or a hard disk, and the like. The type of the storage medium is not limited in the present disclosure.

In step 207, the server determines, among the plurality of second user preference scores, one or more third user preference scores which are similar to the first user preference scores.

In exemplary embodiments, the server may acquire a user preference score of each user for a particular multimedia resource according to the process provided in the above steps 201 to 205. It may do so through processing user viewing data collected by sensors disposed on or in vicinity of playing devices as discussed above. Thus, each multimedia resource may correspond to a plurality of user preference scores if it is released to a plurality of users. The user preference scores are obtained by analyzing user actions of different users during the time the multimedia resource is played. In the embodiments, the first user preference score includes a user preference score of at least one user for the to-be-recommended multimedia resource, and a second user preference score includes a user preference score of at least one user for a recommended multimedia resource.

In step 207, being similar means a difference between user preference scores is less than a first pre-determined value, or all of the user preference scores are greater than a second pre-determined value. The second pre-determined value is greater than the first pre-determined value. Whether user preference scores are similar may also be determined with other methods, which are not limited in the present disclosure. Two exemplary methods to determine whether the first user preference scores are similar to the second user preference scores are described below.

In a first exemplary method, the server calculates a first average value of the first user preference scores of the respective users for the to-be-recommended multimedia resource. Further, the server calculates a second average value of the second user preference scores of the respective users for each recommended multimedia resource. The server may compare a plurality of second average values to the first average value and determine a second average value that is close to the first average value. The server then determines that the third user preference score is a user preference score corresponding to the determined second average value.

In a second exemplary method, after the first preference scores are acquired, user preference scores of the respective users for the to-be-recommended multimedia resource and for the recommended multimedia resources may be categorized based on a plurality of characteristics such as ages, genders, etc. For example, if user preference scores are categorized based on ages, user preference scores of each age group for the to-be-recommended multimedia resource can be statistically processed. For example, user preference scores of users of 10-20, 20-30, 30-40, 40-50, 50-60, and 60 and above years old for the to-be-recommended multimedia resource, may be statistically processed. The user preference scores of the age groups may represent the user preference scores of the to-be-recommended multimedia resource. The second user preference scores of a plurality of users for each recommended multimedia resource may also be similarly categorized based on ages. In each age group, the server may determine one of the second user preference scores that is similar to a first user preference score of the to-be-recommended multimedia resource to be the third user preference score.

In addition, in calculating a user preference score of each age group for the recommended multimedia resource, user preference scores which are lower than a first value and higher than a second value may be excluded. An average value of the remaining user preference scores are calculated and becomes the user preference score of that age group. In addition to the above methods of calculating the user preference score, other calculating methods may also be adopted, which are not limited in the present disclosure.

In step 208, the server determines receiving users of the to-be-recommended multimedia resource based on the one or more third user preference scores, and sends the to-be-recommended multimedia resource to playing devices of the receiving users.

In exemplary embodiments, a plurality of users to receive the to-be-recommended multimedia resource may be further determined in the following manner: determining that one or more of the third user preference scores are greater than a pre-determined threshold, and determining that the users corresponding to the third user preference score(s) which are greater than the pre-determined threshold as users to receive the to-be-recommended multimedia resource.

The pre-determined threshold may be 10, 100, or other values, which is not limited as long as it serves to more accurately recommend the to-be-recommended multimedia resource. Moreover, the pre-determined threshold may be determined depending on the setting of the user preference value and weight.

If the first exemplary method in the above step 207 is employed, multiple third user preference scores may be determined. Thus, the third user preference scores may be further screened through the use of the pre-determined threshold to improve the accuracy in recommending the multimedia resource. For example, the users corresponding to the third user preference scores greater than the pre-determined threshold may be directly determined as the users to receive the to-be-recommended multimedia resource.

If the second exemplary method in the above step 207 is employed, the preference scores of each age group may be compared to a pre-determined threshold. An age group corresponding to the third user preference scores greater than the pre-determined threshold can be determined through the comparison. All users of that age group may be determined to be the users to receive the to-be-recommended multimedia resource.

After the to-be-recommended multimedia resource is recommended and released to the users, user preference scores of the to-be-recommended multimedia resource may be updated through user viewing data collected by a plurality of third sensors mounted on or in vicinity of the playing devices, which receive and play the to-be-recommended multimedia resource. An exemplary update method is illustrated in step 209.

Referring to FIG. 2, in step 209, the server acquires second user viewing data collected by the third sensors mounted on or in vicinity of the playing devices, which receive and play the to-be-recommended multimedia resource. The server analyzes the second user viewing data collected by the third sensors to obtain a plurality of pieces of second user action data corresponding to the to-be-recommended multimedia resource. Based on the second user action data, the server updates the first user preference score of the to-be-recommended multimedia resource.

In this step, acquiring the second user viewing data, acquiring the second user action data based on the second user viewing data, and updating the user preference score of the to-be-recommended multimedia resource based on the second user action data may be similar to the above description in connection with steps 201 to 205, and will not be described again here for brevity. After the first user preference score is updated, the effectiveness of the to-be-recommended multimedia resource is determined based on the updated first user preference score. That is, after the to-be-recommended multimedia resource is actually released, its popularity may be evaluated based on the updated first user preference score. Further, the preference degrees of different groups of users, e.g., young, middle-aged and elderly users, for the to-be-recommended multimedia resource may be statistically processed. As another example, the popularity of the to-be-recommended multimedia resource in connection with playing devices may also be determined through the playing duration on the different playing devices. These evaluation processes may be performed separately or in combination with each other.

In the above embodiments, after the user viewing data of the to-be-recommended multimedia resource in the playing trial run is analyzed to obtain the user action data, the first user preference score of the to-be-recommended multimedia resource may be calculated based on the user action data. The to-be-recommended multimedia resource may be recommended based on the first user preference score and the second user preference scores of the plurality of recommended multimedia resources. Since the first user preference score is calculated based on the user action data corresponding to the to-be-recommended multimedia resource and the user action data may reflect real preference degree of the users for the multimedia resource, the accuracy of recommending the to-be-recommended multimedia resource can be improved.

Figure 3A:
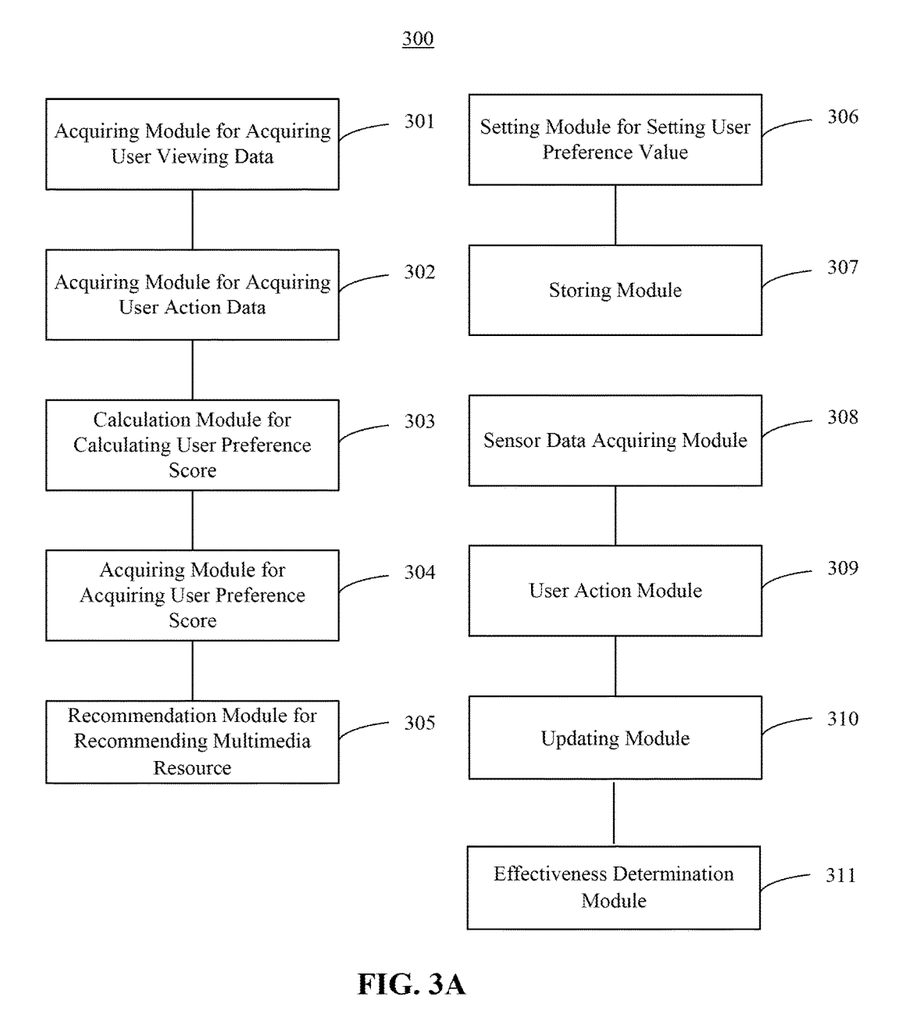
FIG. 3A is a block diagram of an apparatus for recommending a multimedia resource, according to an exemplary embodiment.

FIG. 3A is a block diagram of an apparatus 300 for recommending a multimedia resource, according to an exemplary embodiment. Referring to FIG. 3A, the apparatus 300 includes an acquiring module 301 for acquiring user viewing data, an acquiring module 302 for acquiring user action data, a calculation module 303 for calculating a user preference score, an acquiring module 304 for acquiring a user preference score, and a recommendation module 305 for recommending a multimedia resource.

The acquiring module 301 for acquiring user viewing data is coupled to the acquiring module 302, and configured to acquire user viewing data of a to-be-recommended multimedia resource in a playing trial run. The user viewing data includes at least user audio and video data and user video depth data. The acquiring module 302 for acquiring user action data is coupled to the calculation module 303, and configured to analyze the user viewing data to obtain user action data corresponding to the to-be-recommended multimedia resource. The calculation module 303 for calculating a user preference score is coupled to the acquiring module 304, and configured to calculate a first user preference score of the to-be-recommended multimedia resource based on the user action data corresponding to the to-be-recommended multimedia resource. The acquiring module 304 for acquiring a user preference score is coupled to recommendation module 305, and configured to acquire second user preference scores of a plurality of recommended multimedia resources. The recommendation module 305 for recommending a multimedia resource is configured to recommend the to-be-recommended multimedia resource based on the first user preference score and the second user preference scores.

Figure 3B:
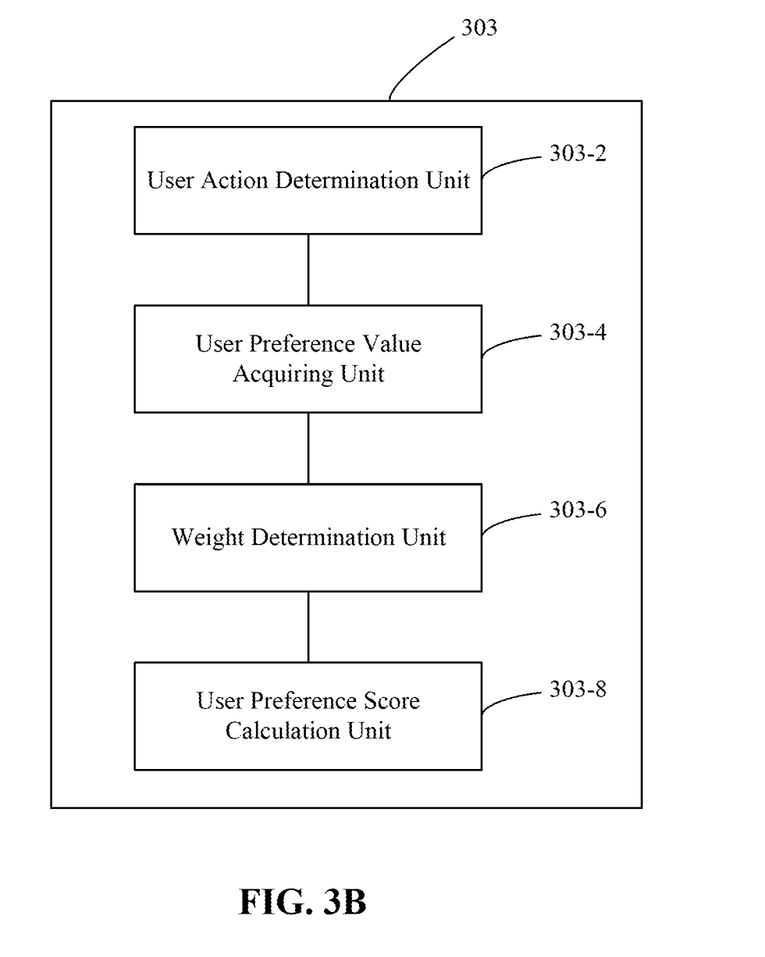
FIG. 3B is a block diagram of a calculating module, according to an exemplary embodiment.

In some embodiments, referring to FIG. 3B, the calculation module 303 for calculating a user preference score may include: a user action determination unit 303-2 configured to determine at least one user action included in each piece of the user action data; a user preference value acquiring unit 303-4 configured to inquire a pre-stored correlation between the user actions and user preference values to obtain a user preference value corresponding to the at least one user action; a weight determination unit 303-6 configured to determine a weight corresponding to each of the user actions based on a ratio of a duration of the user action to a time length of playing the to-be-recommended multimedia resource; and a user preference score calculation unit 303-8 configured to calculate the first user preference score of the to-be-recommended multimedia resource based on the user preference value and the weight corresponding to each of the user actions.

Referring back to FIG. 3A, in exemplary embodiments, the apparatus 300 may further include: a setting module 306 for setting a user preference value, configured to preset a user preference value for each user action; and a storing module 307 configured to store the correlation between the user actions and user preference values.

Figure 3C:
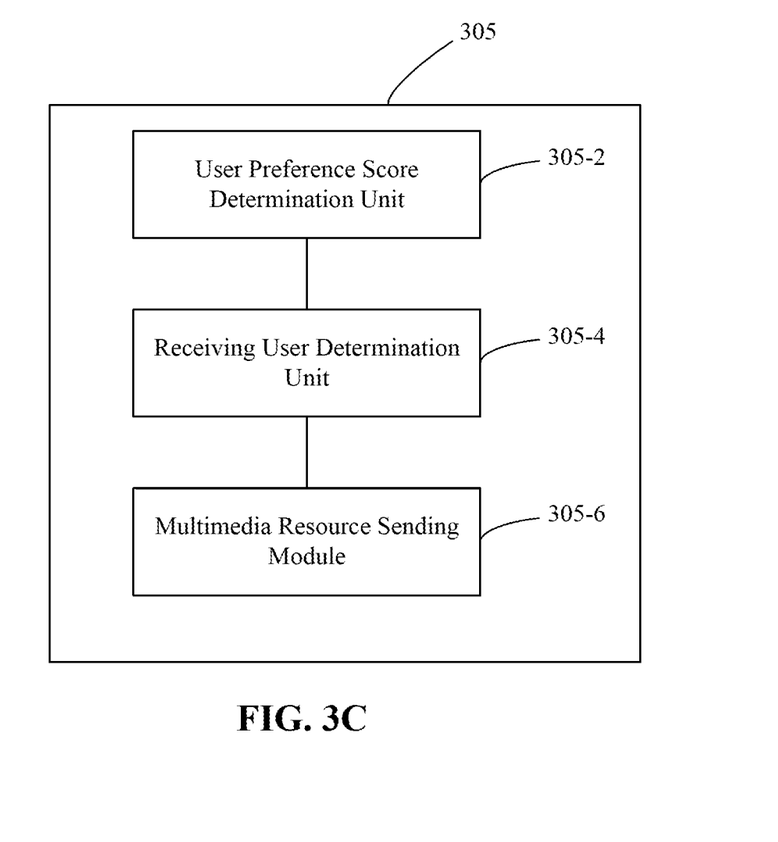
FIG. 3C is a block diagram of a recommendation module, according to an exemplary embodiment.

Referring to FIG. 3C, the recommendation module 305 for recommending a multimedia resource may include: a user preference score determination unit 305-2 configured to, among the second user preference scores, determine a third user preference score which is similar to the first user preference score; a receiving user determination unit 305-4 configured to determine a user to receive the to-be-recommended multimedia resource based on the third user preference score; and a multimedia resource sending module 305-6 configured to send the to-be-recommended multimedia resource to a playing device of the receiving user.

The second user preference scores are calculated based on data collected by second sensors which are mounted on or in vicinity of a plurality of playing devices for playing the recommended multimedia resources.

In exemplary embodiments, the receiving user determination unit 305-4 may be configured to, among third user preference scores, determine a user preference score which is greater than a pre-determined threshold, and determine a user corresponding to the user preference score which is greater than the pre-determined threshold as the user to receive the to-be-recommended multimedia resource.

Referring back to FIG. 3A, in exemplary embodiments, the apparatus 300 may further include: an sensor data acquiring module 308 configured to acquire user viewing data collected by a third sensor corresponding to the to-be-recommended multimedia resource; a user action module 309 configured to analyze the user viewing data collected by the third sensor, to obtain a plurality pieces of user action data corresponding to the to-be-recommended multimedia resource; an updating module 310 for a user preference score, configured to, according to each piece of the user action data, update a user preference score of the to-be-recommended multimedia resource; and an effectiveness determination module 311 configured to determine effectiveness of the to-be-recommended multimedia resource based on the updated user preference score.

It should be noted that the modules 301-311 may be coupled to each other to perform their respective operations.

In exemplary embodiments, the user viewing data may be collected by first sensors which are mounted on or in vicinity of a plurality of playing devices in the playing trial run. Specific operations performed by each module of the apparatus 300 have been described in detail in the embodiments discussed above, which are not repeated herein.

In exemplary embodiments, after the user viewing data of the to-be-recommended multimedia resource in the playing trial run is analyzed to obtain the user action data corresponding to the to-be-recommended multimedia resource, the first user preference score of the to-be-recommended multimedia resource is calculated based on the user action data. The to-be-recommended multimedia resource is then recommended based on the first user preference score and the second user preference scores of the plurality of recommended multimedia resources. Since the first user preference score of the to-be-recommended multimedia resource is calculated based on the user action data, which may reflect real preference degree of the users for the multimedia resource, the accuracy of recommending the to-be-recommended multimedia resource may be improved.

Figure 4:
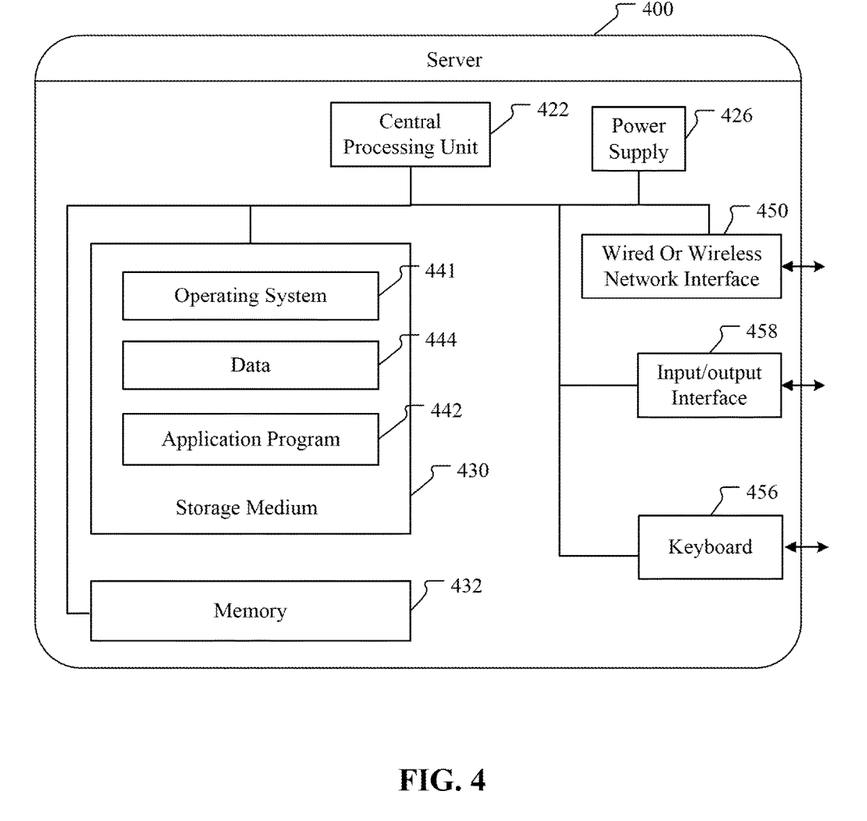
FIG. 4 is a block diagram of a server, according to an exemplary embodiment.

FIG. 4 is a block diagram of a server 400, according to an exemplary embodiment. The server 400 is configured to perform the above methods for recommending a multimedia resource. The server 400 may vary in configuration or capabilities, and may include one or more central processing units (CPU) 422 (for example, one or more processors), a memory 432, one or more storage media 430 (for example, one or more mass storage devices) for storing application programs 442 or data 444. The memory 432 and the storage medium 430 may be volatile or non-volatile. The programs stored in the storage medium 430 may include one or more modules (not shown) each corresponding to a series of instructions executable by the server 400. Further, the central processing unit 422 is configured to communicate with the storage medium 430 and execute the series of instructions in the storage medium 430 on the server 400.

The server 400 may further include one or more power supplies 426, one or more wired or wireless network interfaces 450, and one or more input/output interfaces 458, one or more keyboards 456. The storage medium 430 may store one or more operating systems 441, such as Windows Server™, Mac OS X™, Unix™, Linux™, FreeBSD™, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method performed in a server for recommending a multimedia resource, comprising:
   acquiring user viewing data of a to-be-recommended multimedia resource in a playing trial run, wherein the user viewing data includes at least user audio and video data and user video depth data;
   analyzing the user viewing data to obtain user action data corresponding to the to-be-recommended multimedia resource;
   calculating a first user preference score of the to-be-recommended multimedia resource based on the user action data;
   acquiring a plurality of second user preference scores of a plurality of recommended multimedia resources; and
   recommending the to-be-recommended multimedia resource based on the first user preference score and the second user preference scores,
   wherein the calculating the first user preference score further includes:
      determining at least one user action from the user action data;
      inquiring a pre-stored correlation between user actions and user preference values, to obtain a user preference value corresponding to the at least one user action;
      determining a weight corresponding to the at least one user action based on a ratio of a duration of the at least one user action to a playing time length of the to-be-recommended multimedia resource; and
      calculating the first user preference score based on the user preference value and the weight, and
   wherein before inquiring the pre-stored correlation between the user actions and the user preference values, the method further comprises:
      pre-determining a user preference value for each of the user actions; and
      storing the correlation between the user actions and the user preference values,
   wherein the recommending of the to-be-recommended multimedia resource comprises:
      among the plurality of second user preference scores, determining a third user preference score which is similar to the first user preference score;
      determining a user to receive the to-be-recommend multimedia resource based on the third user preference score; and
      sending the to-be-recommended multimedia resource to a playing device of the receiving user,
   wherein the second user preference scores are calculated based on data collected by a plurality of sensors mounted on or in vicinity of a plurality of playing devices corresponding to the recommended multimedia resources.

2. The method according to claim 1, wherein the determining of the user to receive the to-be-recommended multimedia resource based on the third user preference score comprises:
   determining that the third user preference score is greater than a pre-determined threshold; and
   determining a user corresponding to the third user preference score which is greater than the pre-determined threshold as the user to receive the to-be-recommended multimedia resource.

3. The method according to claim 1, wherein the user viewing data is first user viewing data and, after sending the to-be-recommended multimedia resource to the playing device of the receiving user, the method further comprises:
   acquiring second user viewing data collected by a sensor corresponding to the to-be-recommended multimedia resource;
   analyzing the second user viewing data to obtain a plurality pieces of second user action data corresponding to the to-be-recommended multimedia resource;
   based on each piece of the second user action data, updating the first user preference score of the to-be-recommended multimedia resource; and
   determining effectiveness of the to-be-recommended multimedia resource based on the updated first user preference score.

4. The method according to claim 1, wherein the user viewing data is collected by a plurality of sensors which are mounted on or in vicinity of a plurality of playing devices in the playing trial run.

5. A server for recommending a multimedia resource, comprising:
   a processor; and
   a memory for storing instructions executable by the processor;
   wherein the processor is configured to:
      acquire user viewing data of a to-be-recommended multimedia resource in a playing trial run, wherein the user viewing data includes at least user audio and video data and user video depth data;
      analyze the user viewing data to obtain user action data corresponding to the to-be-recommended multimedia resource;
      calculate a first user preference score of the to-be-recommended multimedia resource based on the user action data;
      acquire a plurality of second user preference scores of a plurality of recommended multimedia resources; and
      recommend the to-be-recommended multimedia resource based on the first user preference score and the second user preference scores,
   wherein, in calculating the first user preference score, the processor is further configured to:
      determine at least one user action from the user action data;
      inquire a pre-stored correlation between user actions and user preference values, to obtain a user preference value corresponding to the at least one user action;

determine a weight corresponding to the at least one user action based on a ratio of a duration of the at least one user action to a playing time length of the to-be-recommended multimedia resource; and
calculate the first user preference score based on the user preference value and the weight,
wherein before inquiring the pre-stored correlation between the user actions and the user preference values, the processor is further configured to:
pre-determine a user preference value for each of the user actions; and
store the correlation between the user actions and the user preference values,
wherein the processor is further configured to:
among the plurality of second user preference scores, determine a third user preference score which is similar to the first user preference score;
determine a user to receive the to-be-recommended multimedia resource based on the third user preference score; and
send the to-be-recommended multimedia resource to a playing device of the receiving user,
wherein the second user preference scores are calculated based on data collected by a plurality of sensors which are mounted on or in vicinity of a plurality of playing devices corresponding to the recommended multimedia resources.

6. The server according to claim 5, wherein the processor is further configured to:
determine that the third user preference score is greater than a pre-determined threshold; and
determine a user corresponding to the third user preference score which is greater than the pre-determined threshold as the user to receive the to-be-recommended multimedia resource.

7. The server according to claim 5, wherein the user viewing data is first user viewing data, and the processor is further configured to:
acquire second user viewing data collected by a sensor corresponding to the to-be-recommended multimedia resource;
analyze the second user viewing data to obtain a plurality pieces of second user action data corresponding to the to-be-recommended multimedia resource;
based on each piece of the second user action data, update the first user preference score of the to-be-recommended multimedia resource; and
determine effectiveness of the to-be-recommended multimedia resource based on the updated first user preference score.

8. The server according to claim 5, wherein the user viewing data is collected by a plurality of sensors which are mounted on or in vicinity of a plurality of playing devices in the playing trial run.

9. A non-transitory storage medium having stored therein instructions that, when executed by one or more processors of a server for recommending a multimedia resource, cause the server to perform:
acquiring user viewing data of a to-be-recommended multimedia resource in a trial playing run, wherein the user viewing data includes at least user audio and video data and user video depth data;
analyzing the user viewing data to obtain user action data corresponding to the to-be-recommended multimedia resource;
calculating a first user preference score of the to-be-recommended multimedia resource based on the user action data;
acquiring a plurality of second user preference scores of a plurality of recommended multimedia resources; and
recommending the to-be-recommended multimedia resource based on the first user preference score and the second user preference scores,
wherein, in calculating the first user preference score, the instructions are executed to cause the server to further perform:
determining at least one user action from the user action data;
inquiring a pre-stored correlation between user actions and user preference values, to obtain a user preference value corresponding to the at least one user action;
determining a weight corresponding to the at least one user action based on a ratio of a duration of the at least one user action to a playing time length of the to-be-recommended multimedia resource; and
calculating the first user preference score based on the user preference value and the weight,
wherein before inquiring the pre-stored correlation between the user actions and the user preference values, the instructions are executed to cause the server to further perform:
pre-determining a user preference value for each of the user actions; and
storing the correlation between the user actions and the user preference values,
wherein the instructions are executed to cause the server to further perform:
among the plurality of second user preference scores, determining a third user preference score which is similar to the first user preference score;
determining a user to receive the to-be-recommended multimedia resource based on the third user preference score; and
sending the to-be-recommended multimedia resource to a playing device of the receiving user,
wherein the second user preference scores are calculated based on data collected by a plurality of sensors which are mounted on or in vicinity of a plurality of playing devices corresponding to the recommended multimedia resources.

* * * * *